United States Patent [19]

Brown

[11] E Re. 29,048

[45] Reissued Nov. 23, 1976

BEST AVAILABLE COPY

[54] AC AND DC REGULATOR CIRCUIT

[75] Inventor: Harold J. Brown, Lorain, Ohio

[73] Assignee: ACME Electric Corporation, Cuba, N.Y.

[22] Filed: Apr. 16, 1973

[21] Appl. No.: 351,440

Related U.S. Patent Documents

Reissue of:

[64] Patent No.: 3,576,443
Issued: Apr. 27, 1971
Appl. No.: 34,062
Filed: May 4, 1970

[52] U.S. Cl. ..... 321/18; 307/12; 323/22 SC; 323/39

[51] Int. Cl.[2] ..... H02J 3/00; H02M 5/257; H02M 7/155

[58] Field of Search ..... 321/2, 16, 18, 47; 323/22 SC, 24, 39; 307/12

[56] References Cited

UNITED STATES PATENTS

| | | | |
|---|---|---|---|
| 3,284,689 | 11/1966 | Rosa | 321/47 X |
| 3,309,623 | 3/1967 | Depenbrock | 321/43 X |
| 3,385,973 | 5/1968 | Abrams et al. | 323/22 SC |
| 3,668,508 | 6/1972 | Archer et al. | 321/18 |

*Primary Examiner*—A. D. Pellinen

*Attorney, Agent, or Firm*—Woodling, Krost, Granger & Rust

[57] ABSTRACT

A circuit for providing a regulated square wave output voltage and a regulated DC output voltage or both. An AC source energizes a switching circuit, having a variable switching rate, which connects a capacitor in voltage clamping relationship to an AC load for both half cycles of the AC voltage thereacross. This switching rate is controlled in accordance with the time accumulation of an electrical quantity, in the present instance the voltage across the AC load. The DC voltage across the capacitor attains a predetermined equilibrium value when the frequency of the AC output voltage is equal to the frequency of the AC source. If the DC capacitor voltage and the AC output voltage derived therefrom deviate from their equilibrium values, as, for example, because of a change in the level of load current, there occur transient changes in the switching rate of the switching circuit which result in changes in the phase displacement between the AC input voltage and the AC output voltage. This phase displacement controls the voltage across an inductor which, in turn, controls the flow of a current which restores the DC capacitor voltage and the amplitude and frequency of the AC output voltage to the desired values while supplying the required power to the AC and DC loads.

2 Claims, 3 Drawing Figures

INVENTOR.
HAROLD J. BROWN

BY John Howard Smith

INVENTOR.
HAROLD J. BROWN

BY John Howard Smith

AC AND DC REGULATOR CIRCUIT

Matter enclosed in heavy brackets [ ] appears in the original patent but forms no part of this reissue specification; matter printed in italics indicates the additions made by reissue.

BACKGROUND OF THE INVENTION

The present invention relates to voltage regulator circuits and is directed more particularly to regulator circuits wherein the AC and DC output voltages are maintained at constant predetermined values by controlling the phase displacement between the input and output AC voltage waves.

Prior to the present invention, static circuits for providing a regulated AC output voltage have been of two major types. These include regulators of the ferroresonant type and switching regulators of the phase controlled type. In circuits of the former-type voltage regulation results from the action of a shunt tank circuit, including a capacitor and a saturable inductor, on a series inductor. Because the shunt capacitor must have a high capacitance value to support the load voltage during each half cycle thereof and because this capacitor must discharge and recharge with a reversed polarity twice during each AC cycle, circuit losses have been high resulting in poor efficiency. Additionally, since proper circuit operation is strongly dependent upon maintaining a predetermined relationship between the inductive and capactive reactances of the circuit, the loads to be used therewith had to be restricted to those having a high-power factor.

In switching regulators of the phase controlled type, regulation is achieved by controlling the conduction of a switch which is in series between the AC source and the AC load. If the input voltage is low, switching occurs early in each half cycle so that a large fraction of the input voltage appears across the AC load. If, on the other hand, the input voltage is high, switching occurs late in each half cycle to prevent much of the input voltage from appearing across the AC load. While regulator circuits of this type adequately control the magnitude of the desired AC voltage, they seriously distort the waveform of both the output voltage therefrom and the input current thereto. The latter distortion can detrimentally affect others using the same power line. In addition, because the switching elements are, in effect, connected across the line, regulator circuits of the phase controlled type are subject to misfiring in the presence of AC line voltage transients.

SUMMARY OF THE INVENTION

Accordingly, it is an object of the invention to provide an AC voltage regulator circuit having improved efficiency and an improved ability to energize low power factor loads.

Another object of the invention is to provide a voltage regulator circuit capable of energizing AC loads, DC loads or both.

Yet another object of the invention is to provide an AC voltage regulator circuit having an output voltage waveform which is substantially independent of the magnitude and power factor of the load current.

It is another object of the invention to provide an AC voltage regulator circuit which causes a corrective voltage to appear between the unregulated input voltage and the regulated output voltage, this corrective voltage subtracting from the input voltage when the latter is higher than the desired AC output voltage and adding to the input voltage when the latter is lower than the desired AC output voltage.

Still another object of the invention is to provide an AC voltage regulator wherein the voltage across the load is maintained substantially constant during each half cycle of the voltage thereacross by the clamping activity of a clamping voltage source, such as a capacitor which is charged to a DC voltage, the polarity of the connections of the clamping voltage source to the load being reversed periodically by a switching circuit to establish thereacross the desired AC output voltage.

It is still another object of the invention to provide an AC voltage regulator circuit wherein an unregulated AC source is connected to the AC load through an inductor and wherein quadrature or reactive currents drawn by the clamping voltage source induce across the inductor a corrective voltage equal to the difference between the unregulated AC input voltage and the desired AC output voltage.

It is another object of the invention to provide an AC voltage regulator wherein the reversals in the AC output voltage occur in response to discrete control events which occur at the end of respective sensing periods, the duration of the sensing periods being determined by the accumulative effect of the output voltage sensed during such period.

Still another object of the invention is to provide an AC voltage regulator circuit of the above character wherein the information received during each sensing period is discarded before the beginning of the next sensing period to allow the time of occurrence of each control event to be controlled in accordance with current circuit conditions.

Another object of the invention is to provide a voltage regulator circuit wherein the amplitude of the AC output voltage is so related to the frequency thereof that the former cannot change without changing the latter and thereby changing the phase displacement between the input and output voltages.

It is yet another object of the invention to provide an AC voltage regulator circuit of the above character wherein a change in the phase displacement between the input and output voltages which results from a decrease in the peak amplitude of the output voltage from its desired value, causes the flow of a current from the AC source that charges the clamping voltage source and thereby raises the output voltage to its desired value.

It is a further object of the invention to provide a voltage regulator circuit of the above character wherein the switching circuit which controls the output voltage frequency is controlled in accordance with control signals from a network that senses the time accumulation of an electrical quantity here shown as the volt-time integral of the AC output voltage, the latter network being arranged to produce a polarity reversing control signal each time the volt-time integral attains a volt-second value equal to the product of the amplitude of the desired square wave output voltage and one-half of the period of the input voltage. This condition assures that the output voltage will have the desired value when the switching circuit causes the output voltage frequency to be equal to the AC source frequency.

It is yet another object of the invention to provide an AC voltage regulator of the above character for which there exists an equilibrium phase displacement between the input and output voltages for each set of input voltages and output currents, this equilibrium phase displacement being just sufficient to cause the flow of a current of a magnitude which will meet the power demands of the load and at the same time keep the clamping voltage source charged to the desired value.

It is still another object of the invention to provide a voltage regulator circuit of the above character wherein the rate of change of current in the inductor is determined by the difference between the input and output voltages and wherein the phase displacement between the input and output voltage is determined by the power requirements of the load.

DESCRIPTION OF THE INVENTION

Figure 1:
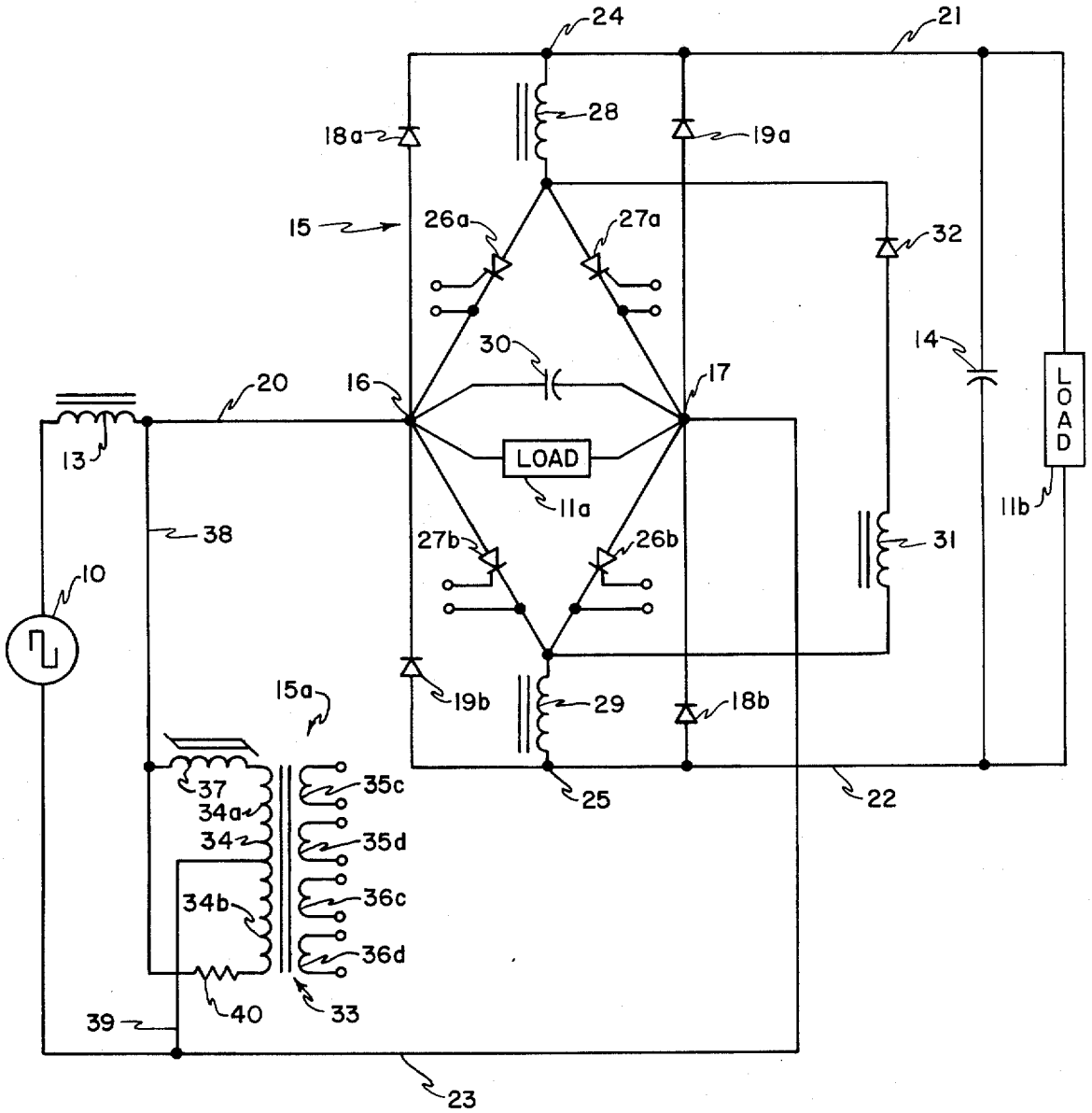
FIG. 1 is a schematic diagram which illustrates one embodiment of the voltage regulator circuit of the invention.

Referring to FIG. 1 there is shown an AC source 10, here shown as being of the square wave type, for energizing an AC load 11a through the AC voltage regulator of the invention. In the present illustrative embodiment, the regulator circuit includes phase responsive buffer means here shown in the form of an inductor 13, a clamping voltage source, which here takes the form of a capacitor 14, a switching circuit 15 and a switching control circuit 15a. As will be seen more fully presently, switching circuit 15 establishes the AC output voltage by reversing the polarity of the connection between load 11a and capacitor 14 which is charged to a predetermined DC voltage. These reversals are initiated by discrete control events which occur at the end of discrete output voltage-sensing periods. By varying the timing of reversals and, thereby, the phase displacement between the input and output voltages, control circuit 15a controls the current which AC source 10 supplies to meet the operative requirements of AC load 11a and also the current which AC source 10 supplies to maintain the voltage across capacitor 14 at a substantially constant, predetermined value. Capacitor 14, in turn, clamps the voltage across the load at the desired constant value, during each half cycle of the voltage thereacross, by charging and discharging through inductor 13 as required to induce thereacross a corrective voltage equal to the instantaneous difference, either positive or negative, between the unregulated AC input voltage and the desired AC output voltage.

To the end that capacitor 14 may charge when the instantaneous value of the AC output voltage between terminals 16 and 17 is greater than the DC voltage across capacitor 14, there are provided first and second charging current conducting means 18a and 18b and 19a and 19b, respectively, which here take the form of diodes. When terminal 16 is positive from terminal 17 by a voltage greater than the voltage across capacitor 14, this capacitor is charged positive on the top by a current which flows from AC source 10, through inductor 13, a conductor 20, diode 18a, a conductor 21, capacitor 14, a conductor 22, diode 18b, and a conductor 23. Similarly, when terminal 17 is positive from terminal 16 by a voltage greater than the voltage across capacitor 14, the capacitor is charged positive on the top by a current which flows from AC source 10 through conductor 23, diode 19a, conductor 21, capacitor 14, conductor 22, diode 19b, conductor 20 and inductor 13. It will be seen, therefore, that capacitor 14 serves as a unidirectional electrical storage element. Thus, diodes 18a, 18b, 19a and 19b, are connected in a rectifying bridge configuration having AC input terminals 16 and 17 and DC output terminals 24 and 25.

To the end that capacitor 14 may discharge when the instantaneous value of the AC output voltage between terminals 16 and 17 is less than the DC voltage across capacitor 14, there are provided first and second discharge current conducting means 26a and 26b and 27a and 27b, respectively, which here take the form of thyristors. When terminal 16 is positive from terminal 17 by a voltage less than the voltage across capacitor 14, it discharges into AC source 10 through conductor 21, a commutating inductor 28, thyristor 26a, conductor 20, inductor 13, AC source 10, conductor 23, thyristor 26b, a commutating inductor 29 and conductor 22. Similarly, when terminal 17 is positive from terminal 16 by a voltage less than the voltage across capacitor 14, it discharges through conductor 21, inductor 28, thyristor 27a, conductor 23, AC source 10, inductor 13, conductor 20, thyristor 27b, inductor 29 and conductor 22. Thus, thyristors 26a, 26b, 27a and 27b are connected in an inverting bridge configuration having DC input terminals 24 and 25 and AC output terminals 16 and 17.

While the diodes of the rectifying bridge conduct whenever they are forward biased, the thyristors of the inverting bridge conduct only when they are forward biased and in addition are provided with respective gate-to-cathode control currents. In the present instance, the gate-to-cathode control currents are supplied from switching control means 15a which will be described more fully presently. A commutating circuit including inductors 28 and 29 preferably wound on a common core and a capacitor 30 operates in the conventional manner to initiate turnoff of the then conducting ducting pair of thyristors when gate-to-cathode control currents are applied to the then nonconducting pair of thyristors. The inverting bridge of FIG. 1 is also provided with a resonant discharge circuit including an inductor 31 and a diode 32. The latter circuit allows capacitor 30 to have a capacitance value sufficient to assure the proper commutation of the thyristors of the inverting bridge, under conditions where load 11a has a low power factor, without significantly affecting the efficiency of the inverting bridge. This resonant discharge circuit is further described in the copending application of Harold J. Brown, Ser. No. 880,652 entitled Power Retrieval Circuit for Inverters.

Upon turnon, as the voltage of AC source 10 is first applied to the regulator circuit, a substantial current flows from AC source 10, through the rectifying bridge, and raises the voltage across capacitor 14 toward the desired clamping voltage value. At first this current includes only an in-phase component, that is, a component which transfers charge from source 10 to capacitor 14 during substantially the entire AC cycle. Later, when the inverting bridge begins to operate, the in-phase component decreases as capacitor 14 begins to charge from source 10 during only a portion of each cycle and to discharge into source 10 during the remainder of each cycle. Finally, when the voltage across capacitor 14 reaches the desired value, no in-phase component of current flows and capacitor 14 receives the same amount of charge during each cycle as it gives up during that cycle. Under these conditions, the current through AC source 10 may be said to be a reactive or quadrature current because it results in no net transfer of energy. If, under these conditions, capacitor 14 has a sufficiently large capacitance value that the voltage thereacross is not substantially changed by the above quadrature current, it will be seen that the DC voltage thereacross will remain substantially constant. This DC voltage constancy, in turn, assures that the AC output voltage which is established by reversing the polarity of the connections between capacitor 14 and load 11a has a constant amplitude during both half cycles thereof. Thus, because the circuit of the invention produces a regulated AC voltage from the regulated DC voltage across capacitor 14, it will be seen that capacitor 14 is both a regulated and a regulating circuit element.

To the end that the above described AC and DC voltage equilibrium conditions may be achieved, a suitable switching control means 15a is provided. In the present embodiment switching control means 15a includes a transformer 33 having a center-tapped primary winding 34 and a plurality of secondary windings 35c, 35d, 36c and 36d. The latter windings are connected to the respective gate-cathode control circuits of thyristors 26a, 26b, 27a and 27b, to control the anode-to-cathode conduction thereof in accordance with the voltage across primary winding 34. As will be described more fully presently, control means 15a allows the voltage which is established between terminals 16 and 17 by the controlled switching activity of the inverting bridge, to shift in phase with respect to the input voltage, as required, to control the in-phase component of current through capacitor 14 in a manner which will maintain the DC voltage thereacross at the desired constant value.

To the end that the phase relationship between the input and output voltages may be controlled in accordance with transient changes in the amplitude of the AC output voltage, control means 15a is arranged to sense the volt-time integral of the voltage between junctions 16 and 17 and to initiate a control event at the end of the sensing period when the volt-time integral attains a predetermined volt-second value. In the present instance this is accomplished by connecting the upper primary winding section 34a of transformer 33 between junctions 16 and 17 through a saturable inductor 37 and conductors 38 and 39 and by connecting the lower primary winding section 34b of transformer 33 between terminals 16 and 17 through a resistor 40 and conductors 38 and 39. This causes the polarity of the voltage across primary winding 34 to reverse each time a voltage of either polarity appears between junctions 16 and 17 long enough to establish a predetermined number of volt-seconds.

When, for example, junction 16 is positive from junction 17, current flows from conductor 20 through conductor 38, resistor 40, lower primary winding section 34b and conductor 39 to conductor 23. This current renders the lower end of primary winding 34 positive with respect to the upper end thereof and thereby causes a gate-to-cathode control current to flow from windings 35c and 35d to thyristors 26a and 26b, respectively, the conduction of which is associated with the stated polarity. During this time, the voltage across saturable inductor 37 is equal to the sum of the voltage between conductors 20 and 23 and the voltage across upper primary winding section 34a. Since inductor 37 can support the latter voltages only so long as the flux in the core thereof can change, it is apparent that, after a predetermined number of volt-seconds have elapsed, the core of inductor 37 will saturate to end the above sensing period. When this occurs, current from conductor 20 to conductor 23 will cease flowing through resistor 40 and begin to flow through conductor 38, saturable inductor 37, upper primary winding section 34a and conductor 39. This will render the upper end of primary winding 34 positive from the lower end thereof and thereby cause gate-to-cathode control currents to flow from secondary windings 36c and 36d to thyristors 27a and 27b, respectively.

Under the above conditions, thyristors 26a and 26b will turn off and thyristors 27a and 27b will turn on. This reversal in the conductive states of the thyristors reverses the polarity of the connections between capacitor 14 and junctions 16 and 17, and, thereby, reverses the polarity of the voltage between conductors 20 and 23. At this time the core of saturable inductor 37 is still saturated but the reversed voltage begins to drive it towards saturation in the opposite direction thus beginning a fresh sensing period with a core which is reset to a predetermined initial condition. Additionally, current will begin to flow upwardly through conductor 39, lower primary winding section 34b, resistor 40 and conductor 38 to maintain the reversed polarity on primary winding 34. It will be understood that any device such as, for example, an operational amplifier, which can be adapted to produce an output signal after a predetermined number of volt-seconds have elapsed, can be utilized in place of the magnetic structure described above.

In view of the foregoing, it will be seen that switching control network 15a senses the voltage between terminals 16 and 17 and reverses the conductive states of the thyristors each time a predetermined number of volt-seconds have elapsed. Since the instantaneous AC voltage between junctions 16 and 17 is substantially constant during each half cycle and is substantially equal in magnitude to the DC voltage across capacitor 14, it is apparent that the switching rate of thyristors of the inverting bridge will be proportional to the DC voltage across capacitor 14. Thus, an increase or decrease in the voltage across capacitor 14 will be accompanied by a proportional increase or decrease, respectively, in the rate at which the thyristors reverse states and, therefore, in the frequency of the output voltage between terminals 16 and 17.

The number of volt-seconds required to initiate a reversal in the polarity of the output voltage may accumulate rapidly if the output voltage is high during the sensing period separating polarity reversals, or may accumulate slowly if the output voltage is low during the sensing period, or may accumulate slowly during part of the sensing period and rapidly during other parts thereof where variations in voltage occur during a given sensing period. The control circuit 15a acts only in response to the accumulated effect of the output voltage at the end of the entire sensing period and is not affected by those extraneous voltage variations (e.g.

ripple voltage) which occur within the sensing period but do not reflect the amplitude of the desired square wave component of the AC output voltage. Therefore, it is unnecessary to filter out the extraneous voltages before determining how the amplitude of the actual output voltage compares with the desired output voltage. As a result, the time constants associated with sensing the output voltage through a filter circuit are eliminated thus improving the dynamic response of the regulator circuitry.

The dynamic response of the circuit of the invention is also improved because the information received by control circuit 15a during each discrete sensing period is discarded when the polarity of the voltage across terminals 16 and 17 reverses at the end of that sensing period. This is because the resetting of the control circuit 15a allows this circuitry to exercise its independent judgment as to the optimum time for the next polarity reversal to occur, in the light of the then volt-second information accumulated since the last polarity reversal. This activity takes place uninhibited by circuit conditions which existed before the last polarity reversal since they have been wiped out by resetting.

The manner in which the above described voltage-frequency relationship results in the establishment and maintenance of the desired AC output voltage will now be described. As the voltage across capacitor 14 rises after turnon due to the flow of the in-phase current, the thyristor switching rate will rise toward the frequency of AC source 10. Assuming that no load is connected between terminals 16 and 17, the voltage between the latter terminals will, at this time, be lagging the voltage of source 10 but will be advancing in phase toward the latter as the switching rate increases. The difference between these voltages appears across phase responsive buffer means 13. I have found that the above phase lag controls the flow of the in-phase component of current from source 10 which charges capacitor 14 and thereby increases the thyristor switching rate. Consequently, as the thyristor switching rate increases and thereby reduces the phase lag between the AC input and AC output voltages, the in-phase component of current which allows the frequency to increase is choked off by phase-responsive buffer means 13. This choking activity is reflected by a decrease in the voltage across phase-responsive buffer means as the phase displacement between the input and output voltage decreases.

Neglecting circuit losses, the thyristor switching rate will be seen to increase until the AC output voltage advances into phase with the AC input voltage. Under the latter conditions there is no phase lag to support the in-phase current required to further increase the capacitor voltage and thyristor switching rate. During operation, if the capacitor voltage and thyristor switching rate attempt to fall from the above values, the phase lag will once again appear and initiate an in-phase component of current which will return both the capacitor voltage and the thyristor switching rate to the values from which they attempted to fall. Thus, because of the phase-responsive characteristics of inductor 13, the AC output voltage and AC output frequency are in equilibrium when the output frequency is equal to the frequency of source 10.

If circuit losses are not neglected, the thyristor switching rate will increase until the frequency of the output voltage is equal to the frequency of source 10, as before, but the output voltage will lag the input voltage by a residual phase angle. This residual phase lag is necessary to support that value of in-phase current through the rectifying bridge which will just supply the losses of switching circuit 15 and capacitor 14. Under these conditions, there is no excess in-phase current available for further increasing the output voltage and frequency. Additionally, if the output voltage and frequency attempt to fall from the above values, the above phase lag will increase and thereby cause an increase in the in-phase current which will restore the capacitor voltage and the AC output voltage and frequency to the values from which they attempted to fall. Thus, the AC output voltage and output frequency can be in equilibrium when the output frequency is equal to the frequency of source 10, even if the output voltage continually lags the input voltage.

Since the DC voltage across capacitor 14 is maintained at a predetermined, substantially constant value, it will be seen that a DC load 11b connected thereacross will be provided with a regulated DC output voltage. A load so connected does not disrupt the normal activity of the regulator circuit because the power required by such a DC load is supplied by an increase in the above discussed in-phase component of current which flows from AC source 10 through the rectifying bridge. Thus, the power drawn by the added DC load is treated in the same manner by the invention as are the losses in the switching circuit 15. Thus, the circuit of the invention can provide a regulated DC voltage to a DC load 11b at the same time it provides a regulated AC voltage to AC load 11a.

It will be understood that if the AC source 10 is connected to the regulator circuitry of the invention through a transformer, a magnetic shunt between the primary and secondary windings thereof may introduce sufficient leakage reactance between source 10 and switching circuit 15 to eliminate the need for a discrete inductor such as inductor 13. This is because a leakage reactance-type transformer is the electrical equivalent of a transformer in series with an inductor. A leakage reactance transformer is further described in my U.S. Pat. No. 2,291,069 entitled Inverter Circuit.

In the present embodiment, control circuit 15a is so designed that, when the above described frequency equilibrium condition exists, the voltage appearing between junctions 16 and 17 has the desired amplitude. This is accomplished by selecting a saturable inductor which, when used with the circuitry of FIG. 1, will initiate a polarity reversal when the volt-time integral of the AC voltage between terminals 16 and 17 is equal to the product of the amplitude of the desired square wave output voltage and a time equal to one-half of the period of the input voltage. This assures that when the period of the AC output voltage is equal to the period of the AC input voltage (frequency equilibrium) the AC output voltage will have the desired amplitude.

Figure 2:
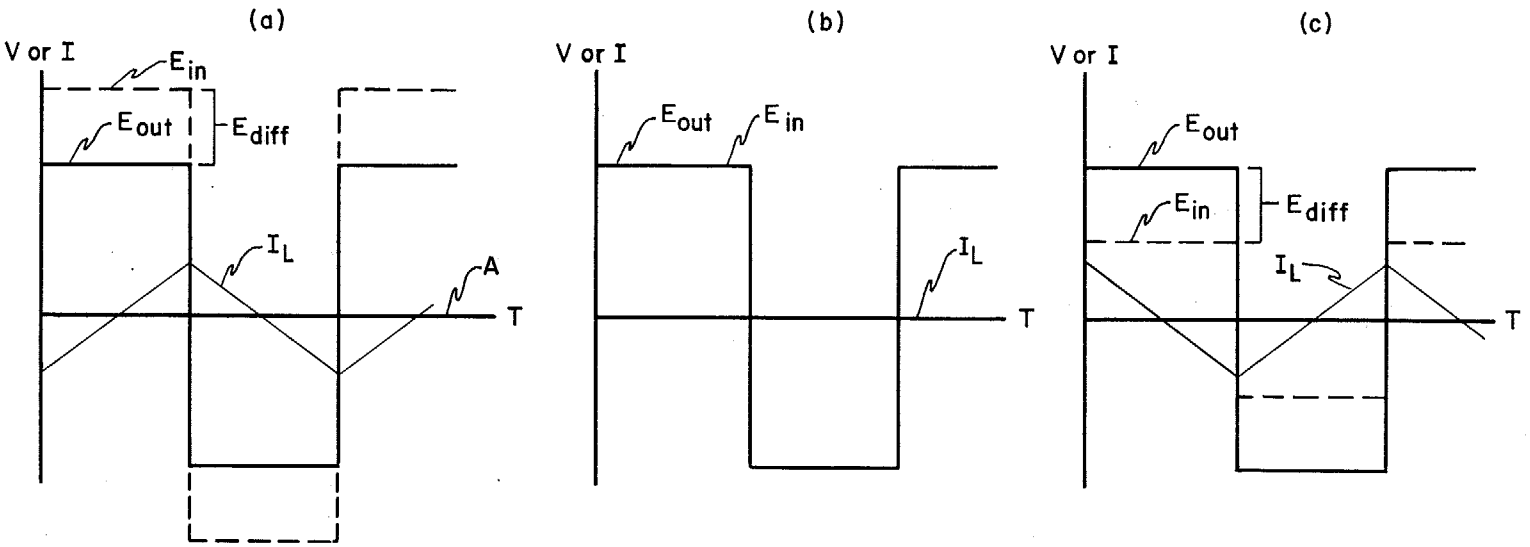
FIG. 2 illustrates voltage and current waveforms which are present in the circuit of FIG. 1 under no load conditions.

Referring to FIGS. 2a, 2b, and 2c there are shown the no-load voltage and current waveforms present within the regulator circuit under high line, nominal line and low line conditions, respectively, if circuit losses are neglected. Under the high line conditions shown in FIG. 2a, the amplitude of the AC input voltage $E_{in}$ exceeds the desired amplitude of the AC output voltage $E_{out}$. Since the latter voltages are disposed in series around the closed loop including AC source 10, buffer means 13, conductor 20, junctions 16 and 17 and conductor 23, it is apparent that the difference between the latter voltages must appear somewhere in the loop if the output voltage is to remain constant. In the present instance, the difference voltage is made to appear across buffer means 13 by the voltage clamping activity of capacitor 14. When this clamping activity occurs, capacitor 14 charges when the voltage between junctions 16 and 17 attempts to rise above the capacitor voltage and discharges when the voltage between junctions 16 and 17 attempts to drop below the capacitor voltage. These charge and discharge currents together comprise a quadrature current which flows through buffer means 13 and induces thereacross a voltage equal to the voltage difference between the input and the output voltages. Because capacitor 14 can change its charge or discharge rates as necessary to give rise to any waveform of difference voltage, it will be seen that the waveform of the input voltage has no effect on the waveform of the output voltage.

Thus, inductor 13 which here serves as phase-responsive buffer means develops a compensatory voltage in response to the flow of quadrature current therethrough when the AC input voltage is unequal to the AC output voltage and chokes off the flow of the excess in-phase current therethrough when the phase displacement between the input and output voltages is diminishing. The former activity employs the buffer property of the inductor 13 and the latter activity employs the phase-responsive property thereof. As a result of both of the above activities, the invention assures a high degree of regulation of both the AC and the DC output voltages in the face of wide variations which may occur in the AC input voltage and the AC or DC output currents.

Under the conditions shown in FIG. 2a, the input and output voltages are in-phase square waves and the difference between them is constant during each half cycle. To induce this difference voltage across inductor 13, capacitor 14 causes the current therein to change at a constant rate during each half cycle, the sign of this rate of change being such that the voltage across inductor 13 subtracts from the voltage across AC source 10 during both half cycles. Because only the AC voltage difference between the input and output voltages appears across inductor 13, it is apparent that no DC level of current can flow therethrough. Thus, the current through inductor 13 changes linearly during each half cycle and is symmetrical about the abscissa A of the current-time plot as shown by curve $I_L$ in FIG. 2a.

It will be understood that if the difference $E_{diff}$ between the input and output voltages $E_{in}$ and $E_{out}$, respectively, shown increase or decrease from the value shown in FIG. 2a, the rate of change and, therefore, the peak amplitude of the current established in inductor 13 by the clamping activity of capacitor 14 will change accordingly to maintain the new difference voltage across inductor 13. It will be seen that the larger the capacitance of the capacitor 14 the smaller will be the ratio or percentage of the AC ripple voltage thereacross to the DC voltage thereacross. A capacitor of such magnitude is permissible in the circuit of the present invention because the circuit of the invention performs its assigned function without requiring any reversal in the polarity of the voltage of capacitor 14 at any time. Accordingly, capacitor 14 may have a capacitance value sufficiently large that the DC voltage thereacross remains substantially constant as the extreme values of charge and discharge currents flow therethrough.

Under the nominal line conditions shown in FIG. 2b, the input voltage is substantially equal to the output voltage and, neglecting circuit losses, is in-phase therewith. Since there is no difference between the input and output voltages, it will be seen that capacitor 14 need not charge or discharge to maintain a changing current through inductor 13. Thus, FIG. 2b shows inductor current $I_L$ to be zero.

Under the low line condition shown in FIG. 2c, the input voltage $E_{in}$ is less than the output voltage $E_{out}$ by a constant voltage during each half cycle. To induce this difference voltage across inductor 13, capacitor 14 causes the current therein to change at a constant rate during each half cycle, the sign of this rate of change being such that the inductor voltage adds to the voltage across AC source 10 during both half cycles. Under these conditions, the inductor current $I_L$ has the waveform shown in FIG. 2c.

In comparing the phase relationships between the above described currents and the corresponding input and output voltages, it is apparent that if circuit losses are neglected, the power given up or received by source 10 in the first half of each half cycle is equal to the power received or given up, respectively, by source 10 in the second half of each half cycle. Consequently, it is apparent that the above described current through inductor 13 is a reactive or quadrature current.

From the foregoing, it will be seen that the output voltage is maintained at the desired value by the voltage clamping activity of capacitor 14, this activity manifesting itself in the maintenance of a quadrature current through inductor 13. It will further be seen that capacitor 14 can alter the magnitude, phase and waveform of the quadrature current as necessary to achieve the desired output voltage regulation manifested by voltage constancy.

If, under the above conditions, a resistive or unity power factor load is connected between junctions 16 and 17, the voltage across capacitor 14 will tend to drop. This is because the output voltage is in phase with the input voltage thus preventing the flow of an in-phase or energy transferring component of current from source 10 to AC load 11a. Initially, therefore, the load current must be supplied by capacitor 14 with a resultant drop in the voltage thereacross. Because control circuit 15a relates the voltage across capacitor 14 to the thyristor switching rate, the capacitor voltage drop is accompanied by a proportional drop in the output voltage frequency. This frequency drop, in turn, causes the output voltage to lag behind the input voltage and thereby initiate the previously described in-phase current component from source 10. Once initiated, the latter current not only supplies the energy required by the load but also supplies the current required to recharge capacitor 14 to its equilibrium voltage. Thereafter, as the voltage across capacitor 14 and the thyristor switching rate return to their equilibrium values, there remains that portion of the phase lag between the input and output voltages which is necessary to maintain an in-phase component of current to supply the load and the regulator circuit losses. Thus, a new equilibrium condition is attained with the output voltage lagging behind the input voltage by an angle dependent upon the circuit power requirements.

If the added load is only partially resistive, the quadrature or reactive component of the current through load 11a will be supplied by capacitor 14 through the rectifying and inverting bridges shown collectively at 15 and the in-phase or power component of load current will be supplied from AC source 10 in the manner described above. From the foregoing, it will be seen as the regulator circuit of the invention is loaded, there occurs a change in the phase displacement between the input and output voltages which allows the transfer of the required power. This phase displacement is the result of a momentary change in the thyristor switching rate which is, in turn, brought about by an attempted change in the voltage across capacitor 14.

If the input voltage and the current requirements of AC load 11a should change at the same time, the quadrature current drawn by the capacitor through inductor 13 will change, as required, to maintain the output voltage substantially at the desired level. In addition, control circuit 15a will shift the phase between the input and output voltages, as necessary, to produce the in-phase component of source current which is necessary to supply the power requirements of load 11a and the losses in the regulator circuit of the invention. The above in-phase current is, of course, in addition to any in-phase component of current flowing through inductor 13 because of DC load 11b.

Figure 3:
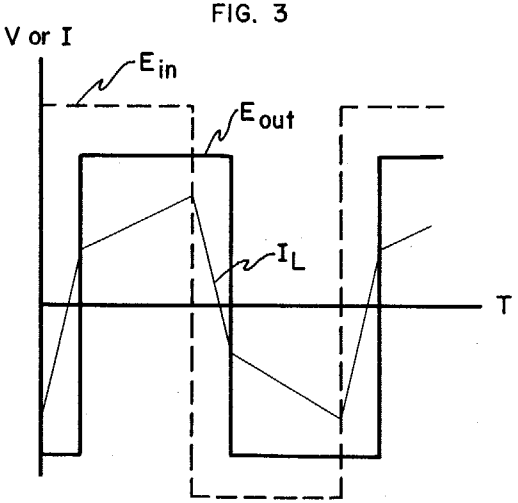
FIG. 3 illustrates voltage and current waveforms which are present in the circuit of FIG. 1 under loaded conditions.

The voltage and current waveform which are present after an equilibrium state is achieved under the above conditions are shown in FIG. 3. Therein, the output voltage $E_{out}$ has a smaller amplitude than the input voltage $E_{in}$ and lags therebehind by an angle determined by the required load current. It will be seen that the rate of change of the inductor current, as indicated by the degree of slope in FIG. 3, is proportional to the instantaneous difference between $E_{out}$ and $E_{in}$ and that the inductor current $I_L$ includes a component which is in phase with $E_{in}$, that is, a current component which causes a transfer of energy that is not canceled by an equal and opposite energy transfer during another portion of the AC cycle. It will be understood that the quadrature component of the inductor current will flow through switching circuit 15 while the in-phase component thereof flows through AC load 11a.

It will be understood that other forms of inverter and rectifier circuits may be utilized to attain the objectives of the invention. The functions of a switching circuit 15 may be served by any suitable inverter circuit which provides for a bidirectional exchange of energy between its DC input and its AC output.

In view of the foregoing, it will be seen that an AC circuit constructed in accordance with the invention provides both a regulated AC output voltage and a regulated DC output voltage for a wide range of AC input voltages both above and below the desired AC output voltage and that this is accomplished without the use of power dissipating series circuit elements, by controlling the quadrature current drawn by a voltage clamping source. It will further be seen that the circuit of the invention maintains the AC and DC output voltages at the desired value for a wide range of amplitudes and power factors of output current and that this is accomplished by controlling the phase displacement between an AC input voltage and a clamped AC voltage derived therefrom.

It will be understood that the embodiment shown herein is for explanatory purposes only and may be changed or modified without departing from the spirit and scope of the appended claims.

I claim:

[ 1. In a circuit for providing a regulated square wave output voltage from an unregulated AC input voltage, in combination, phase responsive buffer means for developing a compensatory voltage in response to a flow of quadrature current therethrough and for choking off the flow of excess in-phase current therethrough when the phase displacement between the input and output voltages is diminishing, load circuit means, means for connecting said phase responsive buffer means and said load circuit means in series relationship across the source of AC input voltage, a chargeable source of clamping voltage, means for conducting a charging current through said clamping voltage source when the instantaneous AC voltage across said load circuit means is greater than the voltage across said clamping voltage source, means for conducting a discharging current from said clamping voltage source when the voltage across said clamping voltage source is greater than the instantaneous AC voltage across said load circuit means, means for connecting said clamping voltage source across said load circuit means through said charging current-conducting means, means for connecting said clamping voltage source across said load circuit means through said discharge current-conducting means and means for controlling the conductivity of said discharge current-conducting means in accordance with the volt-time integral of the voltage across said load circuit means.]

[ 2. An AC voltage regulator as set forth in claim 1 in which said chargeable voltage-clamping source comprises a capacitor. ]

[ 3. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase-responsive buffer means and said load circuit means in series relationship across the source of AC input voltage, unidirectional electrical storage means, switching means for conducting charging current through said storage means when the instantaneous AC voltage across said load circuit means attempts to rise above the voltage across said storage means and for conducting discharging current from said storage means when the instantaneous AC voltage across said load circuit means attempts to fall below the voltage across said storage means, means for connecting said storage means in voltage clamping relationship across said load circuit means through said switching means, means for controlling the discharging activity of said switching means in accordance with the volt-time integral of the voltage across said load circuit means.]

[ 4. A voltage regulator circuit as set forth in claim 3 in which said controlling means includes a transformer having center-tapped primary winding means and secondary winding means, means for connecting the center tap of said primary winding means to one end of said load circuit means, saturable inductance means, resistance means, means for connecting one end of said primary winding means to the other end of said load circuit means through said saturable inductance means, means for connecting the other end of said primary winding means to said other end of said load circuit means through said resistance means, means for connecting said secondary winding means in control relationship to said switching means.]

[5. A voltage regulator circuit as set forth in claim 3 wherein said controlling means senses the output voltage during discrete sensing periods, each of said discrete sensing periods being measured by a predetermined number of volt-seconds.]

[6. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase-responsive buffer means and said load circuit means in series relationship across the source of AC input voltage, unidirectional electrical storage means, rectifying means having AC input means and DC output means, means for connecting the AC input means of said rectifying means across said load circuit means, means for connecting said storage means across the DC output means of said rectifying means, inverting means having DC input means and AC output means, means for connecting said storage means to the DC input means of said inverting means, means for connecting the AC output means of said inverting means across said load circuit means, means for sensing the volt-time integral of the voltage across said load circuit means and means for connecting said sensing means in switching control relationship to said inverting means.]

[7. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase responsive buffer means and said load circuit means in series relationship across the source of AC input voltage, unidirectional electrical storage means, unidirectional conducting means for connecting said storage means in voltage-clamping relationship across said load circuit means when the instantaneous voltage across said load circuit means attempts to rise above the voltage of said storage means, controllable conducting means for connecting said storage means in voltage clamping relationship across said load circuit means when the instantaneous voltage across said load circuit means attempts to fall below the voltage of said storage means, means for controlling said controllable conducting means in accordance with the volt-time integral of the voltage across said load circuit means to prevent changes in the peak amplitude of the voltage across said load circuit means independently of proportional changes in the frequency thereof.]

[8. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough through when the phase displacement between the output and input voltages is diminishing, load circuit means, means for connecting said phase-responsive buffer means and said load circuit means in series relationship across the source of AC input voltage, unidirectional electrical storage means, a switching circuit having DC input terminals and AC output terminals and being arranged to establish a clamped AC voltage across said load circuit means during both half cycles of the AC voltage across said load circuit means, means for connecting the AC output terminals of said switching circuit across said load circuit means, means for connecting said storage means across the DC input terminals of said switching circuit, said switching circuit being arranged to provide a bidirectional exchange of energy between the DC input terminals thereof and the AC output terminals thereof, means for controlling the rate of switching of said switching circuit in accordance with the volt-time integral of the voltage across said load circuit means.]

[9. An AC voltage regulator as set forth in claim 8 in which said switching circuit includes a plurality of controllable conducting means, said controllable conducting means being connected in an inverting bridge configuration having DC terminal means and AC terminal means, commutating inductance means, means for connecting said commutating inductance means between the DC terminal means of said inverting bridge and the DC input terminals of said switching circuit, commutating capacitance means, means for connecting said commutating capacitance means between the AC terminals of said inverting bridge, means for connecting the AC terminals of said inverting bridge to the AC output terminals of said switching circuit, discharge inductance means, unidirectional conducting means for connecting said discharge inductance means between the DC terminals of said inverting bridge, a plurality of unidirectional conducting means, said unidirectional conducting means being connected in a rectifying bridge configuration having AC terminal means and DC terminal means, means for connecting the AC terminal means of said rectifying bridge to the AC output terminals of said switching circuit and means for connecting the DC terminal means of said rectifying bridge to the DC input terminals of said switching circuit.]

[10. An AC voltage regulator as set forth in claim 8 in which said unidirectional electrical storage means comprises a capacitor.]

[11. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase-responsive buffer means and said load circuit means in series relationship across the source of AC input voltage, a chargeable clamping voltage source, first unidirectional conducting means for conducting charging current through said clamping voltage source when the voltage across said load circuit means has a first polarity, second unidirectional conducting means for conducting charging current through said clamping voltage source when the voltage across said load circuit means has a second polarity, first controllable conducting means for conducting discharge current from said clamping voltage source when the voltage across said load circuit means has a first polarity, second controllable conducting means for conducting discharge current from said clamping voltage source when the voltage across said load circuit means has a second polarity, means for connecting said clamping voltage source across said load circuit means through said conducting means, means for sensing the volt-time integral of the voltage across said load circuit means, means for connecting said sensing means in conduction control relationship to said first and second controllable conducting means, said sensing means being adapted to reverse the conductive states of said controllable conducting means each time the volt-time integral of the voltage across said load circuit means attains a volt-second value equal to the product of the amplitude of the desired square wave voltage across said load circuit means and a time equal to one-half of period of the AC input voltage.]

[ 12. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase-responsive buffer means and said load circuit means in series across the source of AC input voltage, unidirectional electrical storage means, switching means having a variable switching rate for alternately and severally connecting said storage means across said load circuit means with a first and second polarity to establish thereacross an AC output voltage having an amplitude substantially equal to the voltage across said storage means, means for sensing the volt-time integral of said AC output voltage, means for connecting said sensing means in switching rate control relationship to said switching means to control the phase displacement between the AC input voltage and said AC output voltage, said phase displacement varying as required to allow the flow of in-phase component of current from the AC source to supply the power required by said load circuit means and to compensate for the circuit losses.]

[ 13. In a circuit for providing a regulated square wave output voltage from an unregulated AC input voltage, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase-responsive buffer means and said load circuit means in series relationship across the source of AC input voltage, unidirectional electrical storage means, switching means having a variable switching rate for connecting said storage means in voltage clamping relationship to said load circuit means for both half cycles of the AC output voltage thereacross, said voltage clamping relationship being characterized by the flow of a quadrature current between said storage means and said phase-responsive buffer means which establishes across said buffer means a voltage equal to the instantaneous difference between the AC input voltage and said AC output voltage, means for sensing the volt-time integral of said AC output voltage, means for connecting said sensing means in switching rate control relationship to said switching means to cause the switching rate of said switching means to be substantially proportional to the amplitude of said AC output voltage, the phase relationship between the AC input voltage and AC input current being controlled, in accordance with the phase displacement which is established between the AC input voltage and said AC output voltage to assure the transfer of power from the AC source to supply the power required by said load circuit means and the power required to maintain a predetermined, substantially constant voltage across said storage means.]

[ 14. In a circuit for providing a regulated square wave output voltage from an unregulated AC input voltage, in combination, a source of unregulated AC voltage, a load, a pair of load terminals, means for connecting said load across said load terminals, a switching circuit including a rectifying network and an inverting network, said inverting network including off-on conducting means, each of said networks having AC and DC terminals, means for connecting said AC terminals to said load terminals, unidirectional electrical storage means, means for connecting the respective DC terminals of said rectifying and inverting networks across said storage means, means for connecting the terminals of said source of AC voltage across said load terminals, phase-responsive buffer means, means for connecting said phase-responsive buffer means in series relationship with said unregulated source of AC voltage across said load terminals, volt-time integral-sensing means, means for connecting said volt-time integral sensing means across said load terminals and means for connecting said volt-time integral sensing means in operative, controlling relationship to respective off-on conducting means in said inverting network.]

[ 15. A voltage regulator circuit as set forth in claim 14 in which said phase-responsive buffer means comprises inductance means.]

[ 16. A voltage regulator circuit as set forth in claim 15 in which said unidirectional electrical storage means comprises capacitance means.]

[ 17. In a circuit for providing a regulated DC output voltage from an unregulated AC input voltage, in combination, phase-responsive buffer means, first and second AC terminal means, means for connecting said phase-responsive buffer means in series with the source of AC input voltage across said AC terminal means, unidirectional electrical storage means, switching means for conducting charging current through said storage means when the voltage across said AC terminal means attempts to rise above the voltage across said storage means and for conducting discharging current from said storage means when the voltage across said AC terminal means attempts to fall below the voltage across said storage means, means for connecting said storage means across said AC terminal means through said switching means, DC load circuit means, means for connecting said load circuit means across said storage means, and means for controlling the discharging activity of said switching means in accordance with the volt-time integral of the voltage between said AC terminal means.]

[ 18. In a circuit for providing regulated AC and DC output voltages from an unregulated AC input voltage, in combination, phase-responsive buffer means for developing a compensatory voltage in response to a flow of quadrature current therethrough and for choking off the flow of excess in-phase current therethrough when the phase displacement between the AC input and AC output voltages is diminishing, AC load circuit means, means for connecting said phase-responsive buffer means and said AC load circuit means in series relationship across the source of the AC input voltage, unidirectional electrical storage means, switching means for conducting charging current through said storage means when the instantaneous voltage across said AC load circuit means attempts to rise above the voltage across said storage means and for conducting discharging current from said storage means when the instantaneous voltage across said AC load circuit means attempts to fall below the voltage across said storage means, means for connecting said storage means in voltage clamping relationship across said AC load circuit means through said switching means, DC load circuit means, means for connecting said DC load circuit means across said storage means, means for controlling the discharging activity of said switching means in accordance with the volt-time integral of the voltage across said load circuit means. ]

[ 19. In a circuit for providing a regulated square wave output from an unregulated AC input, in combination, a source of unregulated AC power, a load, a pair of load terminals, means for connecting said load across said load terminals, a switching circuit, unidirectional electrical storage means, means for connecting said switching circuit to said load terminals, said switching circuit including a network for providing DC voltage across said storage means from said source and a network for providing DC voltage to said load terminals with periodic reversed polarity in the switching mode, phase-responsive means, means for connecting said phase-responsive means in buffering relationship with said source to said load terminals, sensing means, said sensing means being adapted to switch in the conducting activity thereof upon a predetermined time accumulation of an electrical quantity impressed thereupon, means for connecting said sensing means in switching control relationship to said switching circuit. ]

*20. In a circuit for providing a regulated squarewave output voltage from unregulated AC input voltage terminals, in combination, phase-responsive buffer means for developing a compensatory voltage in response to a flow of quadrature current therethrough and for choking off the flow of excess in-phase current therethrough when the phase displacement between the input and output voltages is diminishing, load circuit means, means for connecting said phase-responsive buffer means and said load circuit means in series relationship across AC input voltage terminals, unidirectional electrical storage means, switching means for conducting charging current through said storage means when the instantaneous AC voltage across said load circuit means attempts to rise above the voltage across said storage means and for conducting discharging current from said storage means when the instantaneous AC voltage across said load circuit means attempts to fall below the voltage across said storage means, means for connecting said storage means in voltage clamping relationship across said load circuit means through said switching means, means for controlling the discharging activity of said switching means in accordance with the volt-time integral of the voltage across said load circuit means,*

*said controlling means including a transformer having center-tapped primary winding means and secondary winding means, means for connecting the center tap of said primary winding means to one end of said load circuit means, saturable inductance means, resistance means, means for connecting one end of said primary winding means to the other end of said load circuit means through said saturable inductance means, means for connecting the other end of said primary winding means to said other end of said load circuit means through said resistance means, and means for connecting said secondary winding means in control relationship to said switching means.*

*21. In a circuit for providing a regulated squarewave output voltage from unregulated AC input voltage terminals, in combination, phase-responsive buffer means for developing a compensatory voltage in response to a flow of quadrature current therethrough and for choking off the flow of excess in-phase current therethrough when the phase displacement between the output and input voltages is diminishing, load circuit means, means for connecting said phase-responsive buffer means and said load circuit means in series relationship across AC input voltage terminals, unidirectional electrical storage means, a switching circuit having DC input terminals and AC output terminals and being arranged to establish a clamped AC voltage across said load circuit means during both half cycles of the AC voltage across said load circuit means, means for connecting the AC output terminals of said switching circuit across said load circuit means, means for connecting said storage means across the DC input terminals of said switching circuit, said switching circuit being arranged to provide a bidirectional exchange of energy between the DC input terminals thereof and the AC output terminals thereof, means for controlling the rate of switching of said switching circuit in accordance with the volt-time integral of the voltage across said load circuit means,*

*said switching circuit including a plurality of controllable conducting means, said controllable conducting means being connected in an inverting bridge configuration having DC terminal means and AC terminal means, commutating inductance means, means for connecting said commutating inductance means between the DC terminal means of said inverting bridge and the DC input terminals of said switching circuit, commutating capacitance means, means for connecting said commutating capacitance means between the AC terminals of said inverting bridge, means for connecting the AC terminals of said inverting bridge to the AC output terminals of said switching circuit, discharge inductance means, unidirectional conducting means for connecting said discharge inductance means between the DC terminals of said inverting bridge, a plurality of unidirectional conducting means, said unidirectional conducting means being connected in a rectifying bridge configuration having AC terminal means and DC terminal means, means for connecting the AC terminal means of said rectifying bridge to the AC output terminals of said switching circuit, and means for connecting the DC terminal means of said rectifying bridge to the DC input terminals of said switching circuit.*

* * * * *